(12) United States Patent
Chen

(10) Patent No.: US 9,045,185 B2
(45) Date of Patent: Jun. 2, 2015

(54) TWO-WAY INTERACTIVE LIGHT CONTROL DEVICE

(71) Applicant: Chin Piao Chen, Taichung (TW)

(72) Inventor: Chin Piao Chen, Taichung (TW)

(*) Notice: Subject to any disclaimer, the term of this patent is extended or adjusted under 35 U.S.C. 154(b) by 38 days.

(21) Appl. No.: 13/956,074

(22) Filed: Jul. 31, 2013

(65) Prior Publication Data

US 2015/0035661 A1 Feb. 5, 2015

(51) Int. Cl.
*B62J 3/00* (2006.01)
*B62J 6/00* (2006.01)
*G09F 9/33* (2006.01)
*H05B 33/08* (2006.01)
*H05B 37/02* (2006.01)

(52) U.S. Cl.
CPC ... *B62J 6/00* (2013.01); *G09F 9/33* (2013.01); *H05B 33/0803* (2013.01); *H05B 37/0245* (2013.01)

(58) Field of Classification Search
CPC ............. H05B 33/0803; H05B 37/029; H05B 37/0245; H05B 37/0254
USPC ....... 340/432; 315/185 R, 192, 294, 312, 315
See application file for complete search history.

(56) References Cited

U.S. PATENT DOCUMENTS

| | | | | |
|---|---|---|---|---|
| 7,242,152 | B2* | 7/2007 | Dowling et al. | 315/312 |
| 7,697,925 | B1* | 4/2010 | Wilson et al. | 455/418 |
| 8,766,544 | B2* | 7/2014 | Velazquez | 315/292 |
| 8,860,328 | B2* | 10/2014 | McRae | 315/312 |
| 2009/0045941 | A1* | 2/2009 | Cooper | 340/539.1 |
| 2011/0285299 | A1* | 11/2011 | Kinderman et al. | 315/192 |
| 2012/0206050 | A1* | 8/2012 | Spero | 315/152 |
| 2013/0057181 | A1* | 3/2013 | Bernard et al. | 315/312 |
| 2014/0055053 | A1* | 2/2014 | Chang | 315/201 |

* cited by examiner

*Primary Examiner* — John A Tweel, Jr.
(74) *Attorney, Agent, or Firm* — Muncy, Geissler, Olds & Lowe P.C.

(57) ABSTRACT

A two-way interactive light control device includes a plurality of lamps. Each lamp includes a microcomputer processor, a controlling code setting unit, a controlled code setting unit, a signal transmitting and receiving unit, a light drive unit and light emitting diodes. When the device is started, it can receive a wireless signal automatically and decode to identify whether the lamp is the same product. If there is no same lamp around, the device will set itself as the controller to keep searching the same lamps and to drive the light emitting diodes to twinkle. When the device receives a signal from the same lamps, the same lamps will be the controlled with their light emitting diodes to twinkle synchronously. Thus, when many same lamps meet, they can provide safe and warning effects.

1 Claim, 3 Drawing Sheets

TWO-WAY INTERACTIVE LIGHT CONTROL DEVICE

BACKGROUND OF THE INVENTION

1. Field of the Invention

The present invention relates to a two-way interactive light control device, and more particularly to an interactive light control device which comprises a plurality of lamps to transmit and receive a wireless signal to control the lamps to twinkle synchronously.

2. Description of the Prior Art

A conventional twinkle-type lamp device provides a fixed operation function. The lamp device comprises LEDs which are set in a fixed twinkle mode. Many lamps are operated respectively and unable to twinkle synchronously. Even if the lamps are the same, they cannot be controlled to twinkle synchronously. For example, bicycle twinkle lamps twinkle respectively. When many lamps meet, they cannot be adjusted to twinkle synchronously. The bicycle twinkle lamps only provide warning and safe effects. They are unable to twinkle synchronously to say hello to other persons.

Accordingly, the inventor of the present invention has devoted himself based on his many years of practical experiences to solve these problems.

SUMMARY OF THE INVENTION

The primary object of the present invention is to provide a two-way interactive light control device to overcome the shortcomings of the prior art. The two-way interactive light control device comprises a plurality of lamps. Each lamp comprises a microcomputer processor, a controlling code setting unit, a controlled code setting unit, a signal transmitting and receiving unit, a light drive unit and light emitting diodes. When the device is started, it can send and receive a control signal to search whether there is a same lamp. If there is no same lamp, the device will set itself as the controller to keep searching the same lamp and to drive its light emitting diodes to twinkle. When the device receives a signal from the same lamp, the same lamp will be the controlled with its light emitting diodes to twinkle synchronously. The present invention provides not only safe and warning effects but also an interactive effect to say hello.

DETAILED DESCRIPTION OF THE PREFERRED EMBODIMENTS

Embodiments of the present invention will now be described, by way of example only, with reference to the accompanying drawings.

Figure 1:
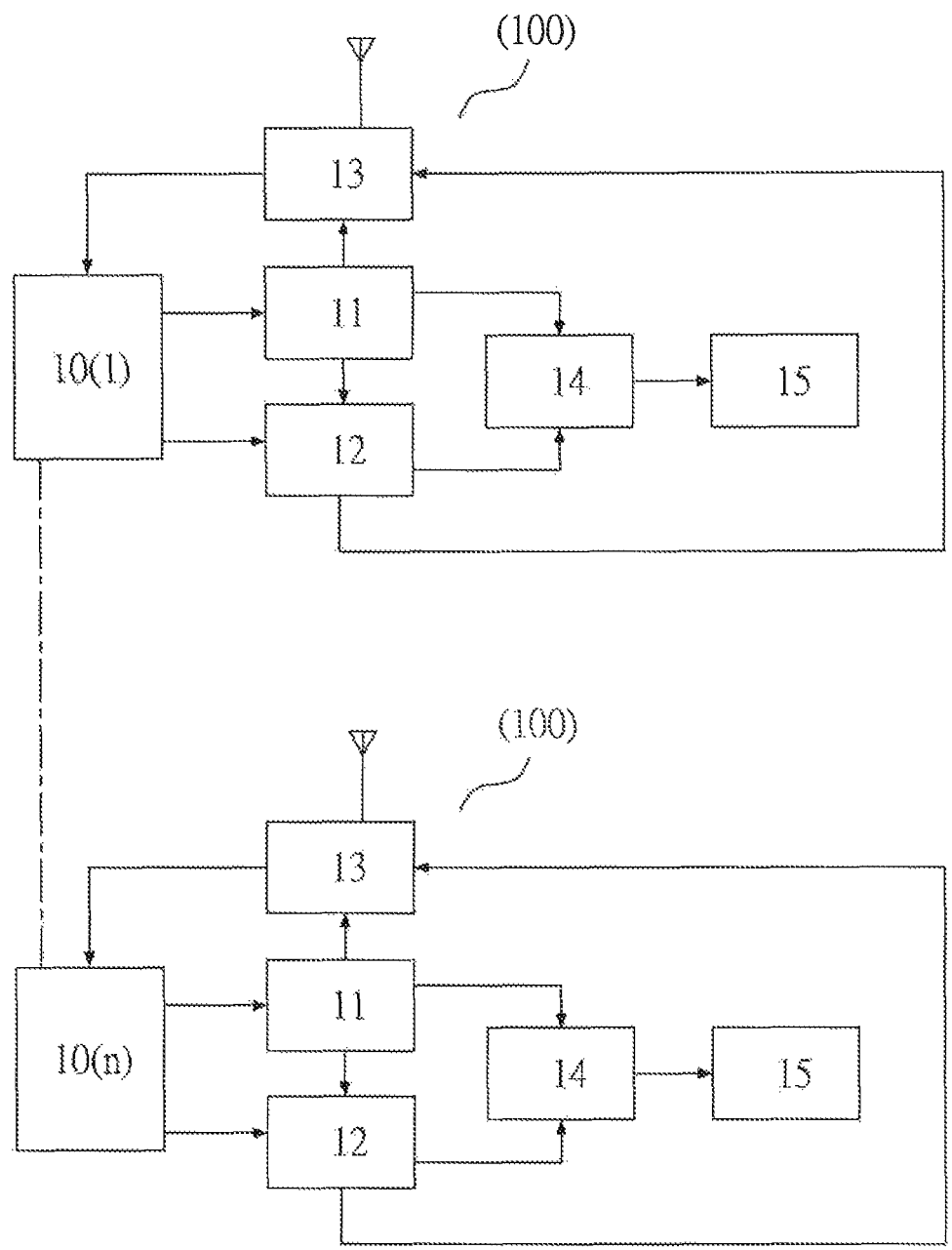
FIG. 1 is a diagram of the present invention.
Figure 2:
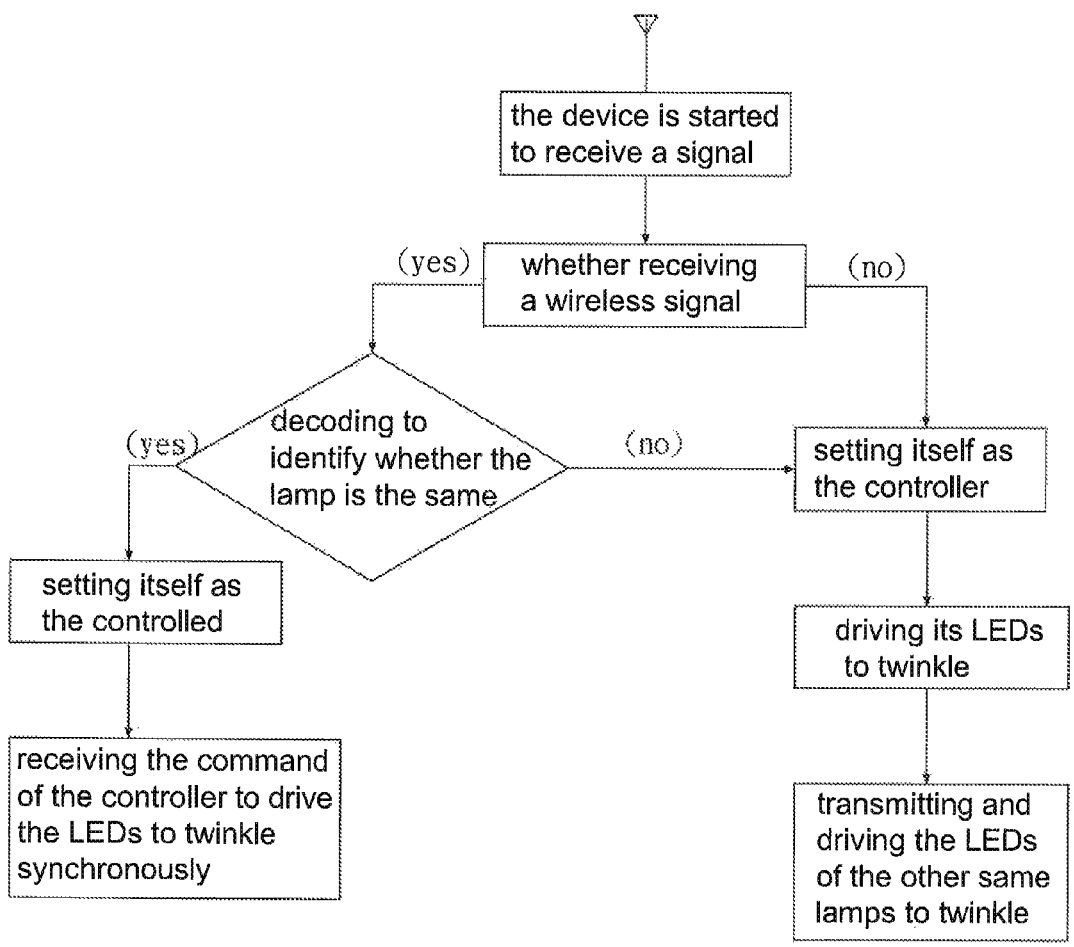
FIG. 2 is a diagram showing operation of the present invention.
Figure 3:
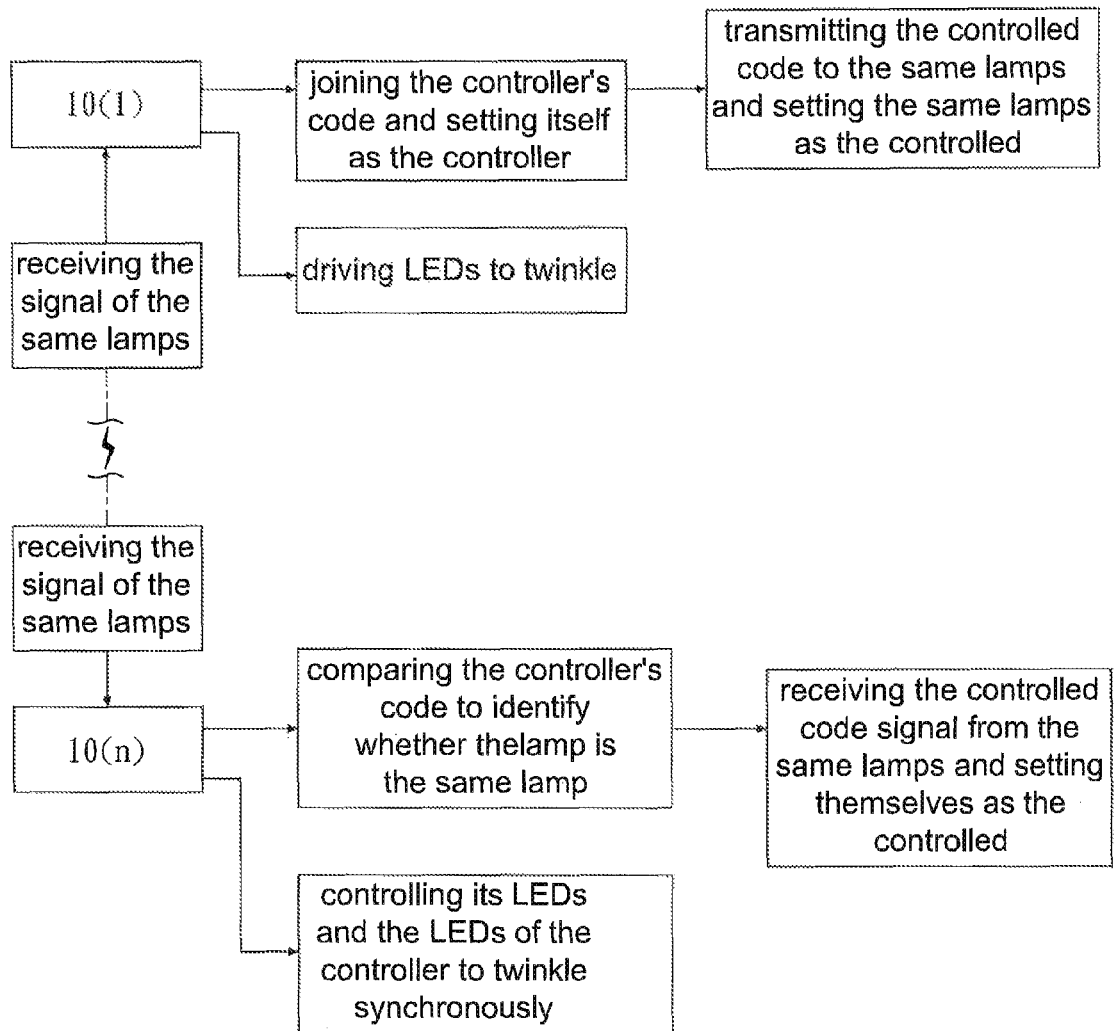
FIG. 3 is a diagram showing operation of the controller and the controlled of the present invention.

As shown in FIG. 1, FIG. 2 and FIG. 3, the present invention comprises a plurality of lamps 100. Each lamp 100 comprises a microcomputer processor 10, a controlling code setting unit 11, a controlled code setting unit 12, a signal transmitting and receiving unit 13, a light drive unit 14 and light emitting diodes 15.

The controlling code setting unit 11 is connected with the microcomputer processor 10, the signal transmitting and receiving unit 13, the light drive unit 14 and the controlled code setting unit 12. When the device is started and there is no other lamps 100 around, the controlling code setting unit 11 encodes and sets itself as the controller.

The controlled code setting unit 12 is connected with the microcomputer processor 10, the signal transmitting and receiving unit 13 and the light drive unit 14. When the device receives a signal from other same lamps 100, the controlled code setting unit 12 sends a controlled code signal and sets the other same lamps as the controlled.

The signal transmitting and receiving unit 13 is connected with the microcomputer processor 10 for receiving a wireless signal and transmitting a control signal.

The light drive unit 14 and the light emitting diodes 15 are connected with the controlling code setting unit 11 and the controlled code setting unit 12. When the light drive unit 14 receives the control signal, the light drive unit 14 will drive the light emitting diodes 15 to twinkle.

The microcomputer processor 10 has the functions of signal comparison, operation and sending a control signal.

According to the aforesaid device, the functions and effects of the present invention are described as follows. Referring to FIG. 1, FIG. 2 and FIG. 3, the lamp 100 is installed on a bicycle for example. After the lamp is started, the signal transmitting and receiving unit 13 can receive (search) a wireless signal. If there is no wireless signal or wireless signal of the same lamps, the controlling code setting unit 11 encodes and sets itself as "the controller" and the light drive unit 14 drives the light emitting diodes 15 to twinkle. At the same time, the controlled code setting unit 12 works and sends a controlled code signal. This action is continued to form a continuous twinkle effect and to search the same lamps 100.

When the same lamps 100 approach the signal receiving range of the aforesaid "controller", the same lamps 100 will receive "the controlled code" signal sent from "the controller". The controlled code setting unit 12 of the same lamps 100 can receive "the controlled code" and change themselves as "the controlled", and the light drive unit 14 drives the light emitting diodes 15 and the light emitting diodes 15 of the controller to twinkle synchronously. The present invention provides an interactive effect to say hello. In particular, when many same lamps 100 meet together, the same lamps 100 will twinkle synchronously to provide an obvious safe effect and an interactive social gathering.

The present invention can be widely used, such as, bicycles, automobiles, buildings, jogging and walking, to provide an obvious and warning effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A two-way interactive light control device, comprising a plurality of lamps, each lamp comprising a microcomputer processor, a controlling code setting unit, a controlled code setting unit, a signal transmitting and receiving unit, a light drive unit and light emitting diodes;

the controlling code setting unit being connected with the microcomputer processor, the signal transmitting and receiving unit, the light drive unit and the controlled code setting unit, wherein when the device is started and there are no other lamps around, the controlling code setting unit encodes and sets itself as a controller;

the controlled code setting unit being connected with the microcomputer processor, the signal transmitting and receiving unit and the light drive unit, wherein when the device receives a signal from other same lamps, the controlled code setting unit sends a controlled code signal and sets the other same lamps as a controlled;

the signal transmitting and receiving unit being connected with the microcomputer processor for receiving a wireless signal and transmitting a control signal;

the light drive unit and the light emitting diodes being connected with the controlling code setting unit and the controlled code setting unit, wherein when the light drive unit receives the control signal, the light drive unit drives the light emitting diodes to twinkle;

the microcomputer processor having functions of signal comparison, operation and sending the control signal;

thereby, the device controlling one of the lamps as the controller and the other lamps as the controlled to control the light emitting diodes of the controller and the controlled to twinkle synchronously.

* * * * *